United States Patent
Cheng et al.

(10) Patent No.: US 8,486,576 B2
(45) Date of Patent: Jul. 16, 2013

(54) IN-LINE HEIGHT MEASUREMENT SYSTEM FOR PLANAR FUEL CELL

(75) Inventors: Yung-Neng Cheng, Taoyuan County (TW); Ruey-Yi Lee, Taoyuan County (TW); Hung-Hsiang Lin, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 1018 days.

(21) Appl. No.: 12/326,874

(22) Filed: Dec. 2, 2008

(65) Prior Publication Data

US 2010/0136375 A1 Jun. 3, 2010

(51) Int. Cl.
*H01M 8/04* (2006.01)
*G01B 7/28* (2006.01)

(52) U.S. Cl.
USPC ............. 429/433; 429/428; 429/434; 33/503; 33/504

(58) Field of Classification Search
USPC ................... 429/434, 428, 433; 33/503, 504
See application file for complete search history.

(56) References Cited

U.S. PATENT DOCUMENTS

| | | | | |
|---|---|---|---|---|
| 5,009,512 A * | 4/1991 | Lessi et al. | ......................... | 374/6 |
| 5,072,522 A * | 12/1991 | Stott et al. | ........................ | 33/503 |
| 5,179,786 A * | 1/1993 | Shelton | ............................ | 33/503 |
| 5,189,807 A * | 3/1993 | Gustafsson | ..................... | 33/702 |
| 5,399,016 A * | 3/1995 | Martin | ............................... | 374/7 |
| 6,829,838 B1 * | 12/2004 | Weekers et al. | ................. | 33/702 |
| 2004/0205974 A1 * | 10/2004 | Ogura | ............................. | 33/503 |
| 2005/0095492 A1 * | 5/2005 | Frank et al. | ..................... | 429/35 |

* cited by examiner

*Primary Examiner* — Patrick Ryan
*Assistant Examiner* — Alex Usyatinsky

(57) ABSTRACT

An in-line planar fuel cell height measurement system is mainly composed of a main stand, at least a top platform above a high temperature furnace, a displacement detection unit on the top platform with a central axis connecting to an extension rod that goes downward into the high temperature furnace and contacts the top surface of the cell stack inside the high temperature furnace, a displacement display unit connecting to the displacement detection unit through signal transmission cables, and a data processing unit connecting to the displacement display unit through signal transmission cables, so the displacement detection unit can sense the height change for the cell stack in the high temperature furnace during temperature rise and operation and send out a signal, which can be directly displayed by the displacement display unit and received by a data processing unit for further analysis and storage.

7 Claims, 2 Drawing Sheets

IN-LINE HEIGHT MEASUREMENT SYSTEM FOR PLANAR FUEL CELL

BACKGROUND OF THE INVENTION

1. Field of the Invention

The invention relates to an in-line height measurement system for planar fuel cell, especially a height measurement system that has simple operation and immediate access to measurement data.

2. Description of the Prior Art

Planar solid oxide fuel cell (SOFC) is a fuel cell that is used in high temperature environment. The sealing method for its cell stack includes compressive seal and ceramic glass seal. The compressive seal is a common method for low temperature sealing with the main advantages in easy disassembly and simple sealing principle. However, the biggest problem with this method is little availability for gasket material and high requirement for assembly precision. Ceramic glass seal is presently a more common sealing method for cell stack because it offers flexibility and elasticity at high temperature and suitability for SOFC operation at high temperature. It is also because the glass seal material thickness can be changed with pressure at high temperature. This will help reduce the difficulty in cell stack assembly design. The ability for thickness variation can compensate for the errors from design or fabrication. So the thickness variation with time and temperature is a critical parameter to design or operation. It is necessary to have an appropriate measurement and investigation on this parameter. Besides, there are other subjects that require cell stack height measurement to understand cell stack performance. Therefore, the measurement on cell stack height is imperative.

Traditional cell stack height measurement method for planar solid oxide fuel cell (SOFC) mainly includes the following steps: 1. After cell stack is assembled, using caliper to measure the heights at four corners and record them; 2. After cell stack is through high temperature sintering and the first time performance test, lowering the temperature, opening the furnace and re-measuring the heights at the four corners; 3. Subtracting the height of the second measurement from the height of the first measurement to obtain height change for the four corners; 4. taking the average for the height at the four corners to obtain the average height change.

The above procedure is time-consuming and poses difficulty in operation in addition to failing to correlate time or temperature to height change. It is difficult to control the temperature and time for glass seal material and immediately obtain height change data.

Therefore, the procedure does not satisfy the needs in an actual application

In view of the shortcomings with the traditional cell stack height measurement, the inventor has found improvement in this invention.

SUMMARY OF THE INVENTION

The main objective for the invention is to provide an in-line planar fuel cell height measurement system that can simultaneously measure and record the relationship among furnace temperature, time and cell stack height and also conveniently and effectively determine the effect of cell stack assembly parameters on its performance.

Another objective for the invention is to provide an in-line planar fuel cell height measurement system through which the obtained data can be used to study the operation and behavior characteristics for each sealing material (like glass sealing material) and as references to improving cell stack testing procedure.

To achieve the above objectives and effects, the technical approaches by the invention include: a main stand, at least a top platform above a high temperature furnace, a displacement detection unit on the top platform with a central axis connecting to an extension rod that goes downward into the high temperature furnace and contacts the top surface of the cell stack inside the high temperature furnace to sense the height change for the cell stack before and after thermal expansion and send out a signal, and a data processing unit that can receive the output signal from the displacement detection unit and analyze and store the signal.

For the above structure, between the displacement detection unit and the data processing unit there is a displacement display unit that can directly display the information sensed by the displacement detection unit.

As for the detailed structure, application principles, effects and performance, please refer to the following description and figures for complete understanding.

DETAILED DESCRIPTION OF THE INVENTION

Figure 1:
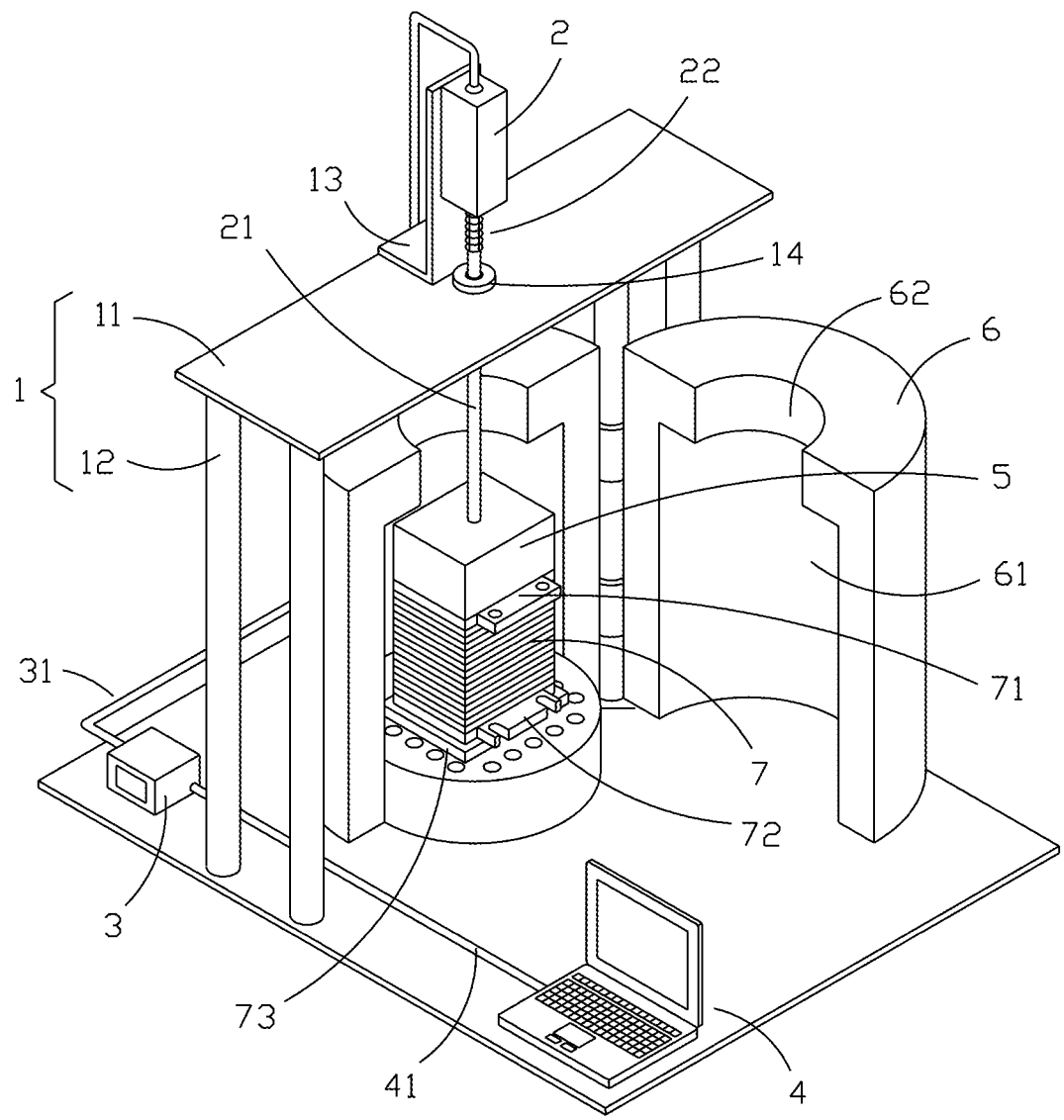
FIG. 1 is an overall structural illustration for the invention.
Figure 2:
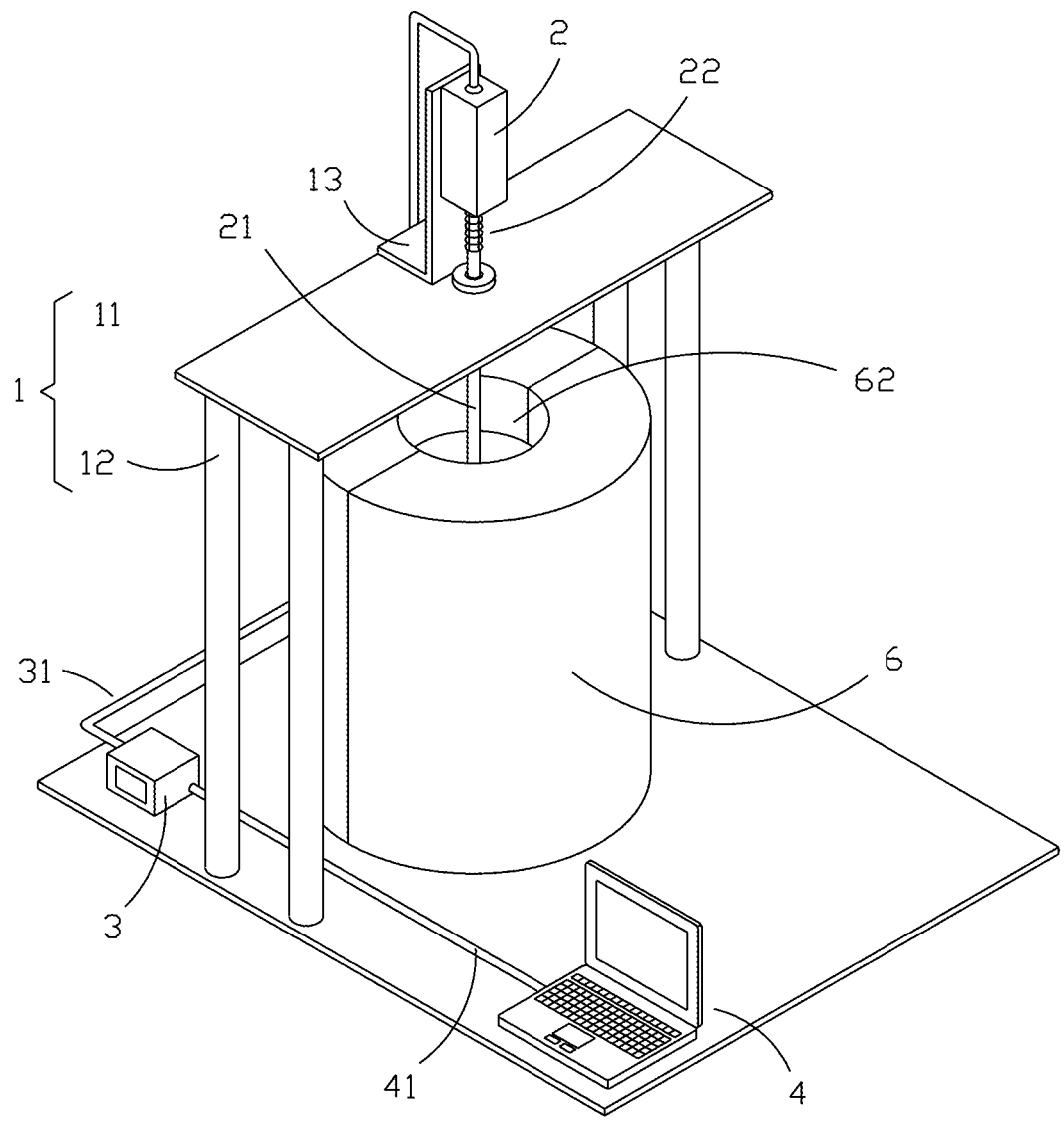
FIG. 2 is another overall structural illustration for the invention.

From FIG. 1 and FIG. 2, it is clear to find out that the structure for the invention is mainly composed a stand 1, displacement detection unit 2, displacement display unit 3 and data processing unit 4. The main stand 1 uses a plural number of pillars 12 to support a top platform 11 above a high temperature furnace 6. In the high temperature furnace 6 there is an accommodation space 61 with an opening 62 on a side. The accommodation space 61 can accommodate a cell stack 7, which is located on a cell stack bottom plate 73. On the top end and the bottom end for the cell stack 7 there are a top and a bottom holding plates 71, 72. Above the holding plate 71 there is a stationary load 5. In the center of the top platform 11 there is a through-hole, around which there is a bearing 14. By the bearing 14 there is a L-shape fixation fixture 13. The displacement detection unit 2 is attached to the fixation fixture 13 by a screw bolt to form an assembly structure that is easy to assemble or to disassemble. The displacement detection unit 2 has a central axis connecting to an extension rod 21 that passes downward through the bearing 14 and the opening 62 into the accommodation space 61 of the high temperature furnace 6 and pushes against the stationary load 5. Between the bottom surface of the displacement detection unit 2 and the extension rod 21 there is an elastic unit 22 (it can be a coil spring) for the extension rod 21 to maintain downward elasticity. The displacement display unit 3 uses a signal transmission cable 31 to connect to the output end of the displacement detection unit 2. The data processing unit 4 uses a signal transmission cable 41 to connect to the displacement display unit 3 in parallel. In operation, the extension rod 21 pushes against the top surface of the stationary load 5 and it effectively senses the height change for the cell stack 7 in the high temperature furnace 6 before and after thermal expansion. Then the displacement detection unit 2 sends out a signal. The data signal is sent through the signal transmission cables 31, 41 to the displacement display unit 3 and the data processing unit 4. The displacement display unit 3 will directly display the information output from the displacement detection unit 2. The data processing unit 4 can receive the output signal from the displacement detection unit 2 and analyze and store the signal.

In the above structure, the bearing 14 is to guide the extension rod 21, prevent the extension rod 21 from shifting, reduce side friction and facilitate vertical movement in the measurement for height change for the cell stack 7. The two ends of the extension rod 21 are semispherical to lower the contact area between the extension rod 21 and the cell stack 7 or the central axis of the detection unit 2. They also prevent issues with central alignment. If the central axis of the displacement detection unit 2 is metal and has a small diameter, it will not be suitable to go directly into the high temperature furnace 6. Thus, the extension rod 21 usually is ceramic to prevent issues with oxidation or insufficient strength. The displacement detection unit 2 uses the weight of the central axis and the elasticity of the elastic unit 22 to provide downward pressure and overcome the contact between the central axis and the periphery. This also maintains the contact between the lower end of the extension rod 21 and the upper end (stationary load 5) of the cell stack 7. Therefore, the elastic constant for the elastic unit 22 should be small to reduce the force change within the range of displacement change. It works with the stationary load 5 to effectively increase the precision of data processing.

Further, the displacement detection unit 2 can find commercial products available in the market. It can be a displace sensor, a linear scale or a linear variable differential transformer (LVDT). The displacement display unit 3 usually works with the displacement detection unit 2 and can also find available commercial products to indicate displacement (height change). The data processing unit 4 can be a computer or other microprocessor that can analyze and process the detected information and generate the desired information.

It is known from the above that the in-line planar fuel cell height measurement system in the invention provides simple operation and immediate access to measurement data. It possesses the utility, novelty and progressiveness.

The above description is only for a preferred embodiment of the invention and not to limit the scope of the invention. Those equivalent changes and modifications based on the principle of the invention shall still fall into the scope of the patent application.

What is claimed is:

1. An in-line height measurement system for planar fuel cell comprising:
    a main stand,
    a top platform provided above a furnace,
    a displacement detection unit on the top platform with a central axis connecting to an extension rod extending downward into the furnace and contacting the top surface of the planar fuel cell stack inside the furnace,
    a top and a bottom holding plates that are placed on and under the planar fuel cell, respectively,
    a stationary load placed on the top holding plate, wherein the displacement detection unit has a central axis connecting to the extension rod that passes downward through a bearing and opening into the furnace and pushes against the stationary load, and
    a data processing unit receiving the output signal from the displacement detection unit to analyze and store the signal;
    wherein the displacement detection unit uses an elastic unit to push on the extension rod for keeping a downward force to enable the extension rod firm contacting the top holding plate on the planar fuel cell and maintain downward elasticity during displacement measurement; and
    wherein two ends of the extension rod are semi-spherical to ease central alignment, reduce friction and transfer the downward force from the extension rod to the top holding plate on the planar fuel cell vertical during detection of height displacement of the planar fuel cell.

2. According to claim 1 for an in-line height measurement system for planar fuel cell, wherein between the displacement detection unit and the data processing unit there is a displacement display unit provided to directly display the information sensed by the displacement detection unit.

3. According to claim 1 for an in-line height measurement system for planar fuel cell, wherein on the top platform there is a bearing provided to guide the extension rod.

4. According to claim 1 for an in-line height measurement system for planar fuel cell, wherein the elastic unit of the displacement detection unit is a coil spring.

5. According to claim 1 for an in-line height measurement system for planar fuel cell, wherein the extension rod is ceramic to maintain high temperature strength.

6. According to claim 1 for an in-line height measurement system for planar fuel cell, wherein the displacement detection unit is attached to the top platform through a fixation fixture.

7. According to claim 1 for an in-line height measurement system for planar fuel cell, wherein there are a plural number of pillars around the top platform to support the top platform.

* * * * *